(12) United States Patent
Chang et al.

(10) Patent No.: US 9,887,623 B2
(45) Date of Patent: Feb. 6, 2018

(54) EFFICIENT VOLTAGE CONVERSION

(71) Applicant: International Business Machines Corporation, Armonk, NY (US)

(72) Inventors: Leland Chang, New York, NY (US); Robert K. Montoye, New York, NY (US); Jae-sun Seo, Tempe, AZ (US); Albert M. Young, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/291,092

(22) Filed: Oct. 12, 2016

(65) Prior Publication Data
US 2017/0033685 A1 Feb. 2, 2017

Related U.S. Application Data

(63) Continuation of application No. 14/566,944, filed on Dec. 11, 2014.

(51) Int. Cl.
*H02M 3/07* (2006.01)
*H02M 3/155* (2006.01)
*G06F 1/26* (2006.01)

(52) U.S. Cl.
CPC ............... *H02M 3/07* (2013.01); *G06F 1/26* (2013.01); *H02M 3/155* (2013.01)

(58) Field of Classification Search
CPC ............ G06F 1/26; H02M 3/07; H02M 3/155
See application file for complete search history.

(56) References Cited

U.S. PATENT DOCUMENTS

| | | | |
|---|---|---|---|
| 5,734,291 | A | 3/1998 | Tasdighi et al. |
| 6,972,973 | B2 | 12/2005 | Abe et al. |
| 7,109,749 | B2 * | 9/2006 | Khanna ............ H03K 19/17784 326/37 |
| 7,259,612 | B2 | 8/2007 | Saether |

(Continued)

OTHER PUBLICATIONS

Chang et al., A Fully-Integrated Switched-Capacitor 2:1 Voltage Converter with Regulation Capability and 90% Efficiency at 2.3A/mm2, 2010 Symposium on VLSI Circuits/Technical Digest of Technical Papers, pp. 55-56, © 2010 IEEE.

(Continued)

*Primary Examiner* — M Elamin
(74) *Attorney, Agent, or Firm* — Steven F. McDaniel

(57) ABSTRACT

An apparatus for providing on-chip voltage-regulated power includes a switched capacitor voltage conversion circuit that receives an elevated power demand signal and operates at a base rate when the elevated power demand signal is not active and at an elevated rate when the elevated power demand signal is active. The switched capacitor voltage conversion circuit comprises an auxiliary set of transistors that are disabled, when the elevated power demand signal is not active and enabled, when the elevated power demand signal is active. The apparatus may also include a droop detection circuit that monitors a monitored power signal and activates the elevated power demand signal in response to the monitored power signal dropping below a selected voltage level. The monitored power signal may be a voltage input provided by an input power supply for the switched capacitor voltage conversion circuit. A corresponding method is also disclosed herein.

11 Claims, 6 Drawing Sheets

(56) References Cited

U.S. PATENT DOCUMENTS

| | | |
|---|---|---|
| 7,535,281 B2 | 5/2009 | Olsen |
| 7,583,133 B2 | 9/2009 | Ivanov et al. |
| 7,973,592 B2 | 7/2011 | Pan |
| 8,423,800 B2 | 4/2013 | Huang et al. |
| 8,754,672 B2 | 6/2014 | Dennard et al. |
| 2010/0214014 A1 | 8/2010 | Dennard et al. |
| 2010/0259299 A1 | 10/2010 | Dennard et al. |
| 2012/0169319 A1 | 7/2012 | Dennard et al. |

OTHER PUBLICATIONS

Le et al., A Sub-ns. Response Fully Integrated Battery-Connected Switched-Capacitor Voltage Regulator Delivering 0.19W/mm2 at 73% Efficiency, ISSCC 2013, Session 21, Power Converters, 21.6, pp. 372-374, 2013 IEEE International Solid-State Circuits Conference, © 2013 IEEE.

Chang et al., "Efficient Voltage Conversion", U.S. Appl. No. 14/566,944, filed Dec. 11, 2014, 23 pages.

IBM Appendix P, list of patents and patent applications treated as related, Oct. 11, 2016, 2 pages.

\* cited by examiner

EFFICIENT VOLTAGE CONVERSION

This application is a continuation of U.S. patent application Ser. No. 14/566,944, filed on Dec. 11, 2014, now U.S. Pat. No. 9,755,506.

BACKGROUND OF THE INVENTION

The present invention relates generally to the field of power conversion devices, and more particularly to on-chip voltage conversion devices.

Voltage conversion circuits enable devices to operate at voltage levels that are suited to the functional and performance requirements of the devices. In particular, on-chip power delivery has become important for high performance devices such as processors, where power consumption is high, and power losses due to package parasitics are significant. Step-down on-chip voltage converters enable board-level DC-DC converters to operate at reduced current levels and higher efficiency, resulting in a reduction of power losses including IR losses and Ldi/dt losses.

Switched-capacitor (SC) circuits provide high efficiency voltage conversion for integer conversion ratios (e.g., 2:1 voltage conversion demonstrated at 90%, L. Chang, et al., VLSI Circuits 2010) and enable high voltage power delivery to the chip on which they reside. However, one of the challenges in voltage regulation using switched-capacitor voltage converters is managing output voltage droop and noise induced by abrupt load current changes. Output voltage droop can be very high (i.e., 50-100 mV) resulting in large voltage overhead margins and significantly degraded system-level power/performance.

SUMMARY

As disclosed herein, an apparatus for providing on-chip voltage-regulated power includes a switched capacitor voltage conversion circuit that receives an elevated power demand signal and operates at a base rate when the elevated power demand signal is not active and at an elevated rate when the elevated power demand signal is active. The switched capacitor voltage conversion circuit comprises an auxiliary set of transistors that are disabled when the elevated power demand signal is not active (i.e., during normal power demand conditions) and enabled when the elevated power demand signal is active. The apparatus may also include a droop detection circuit that monitors a monitored power signal and activates the elevated power demand signal in response to the monitored power signal dropping below a selected voltage level. The monitored power signal may be a voltage input provided by an input power supply for the switched capacitor voltage conversion circuit. A corresponding method is also disclosed herein.

It should be noted that references throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

DETAILED DESCRIPTION

Figure 1A:
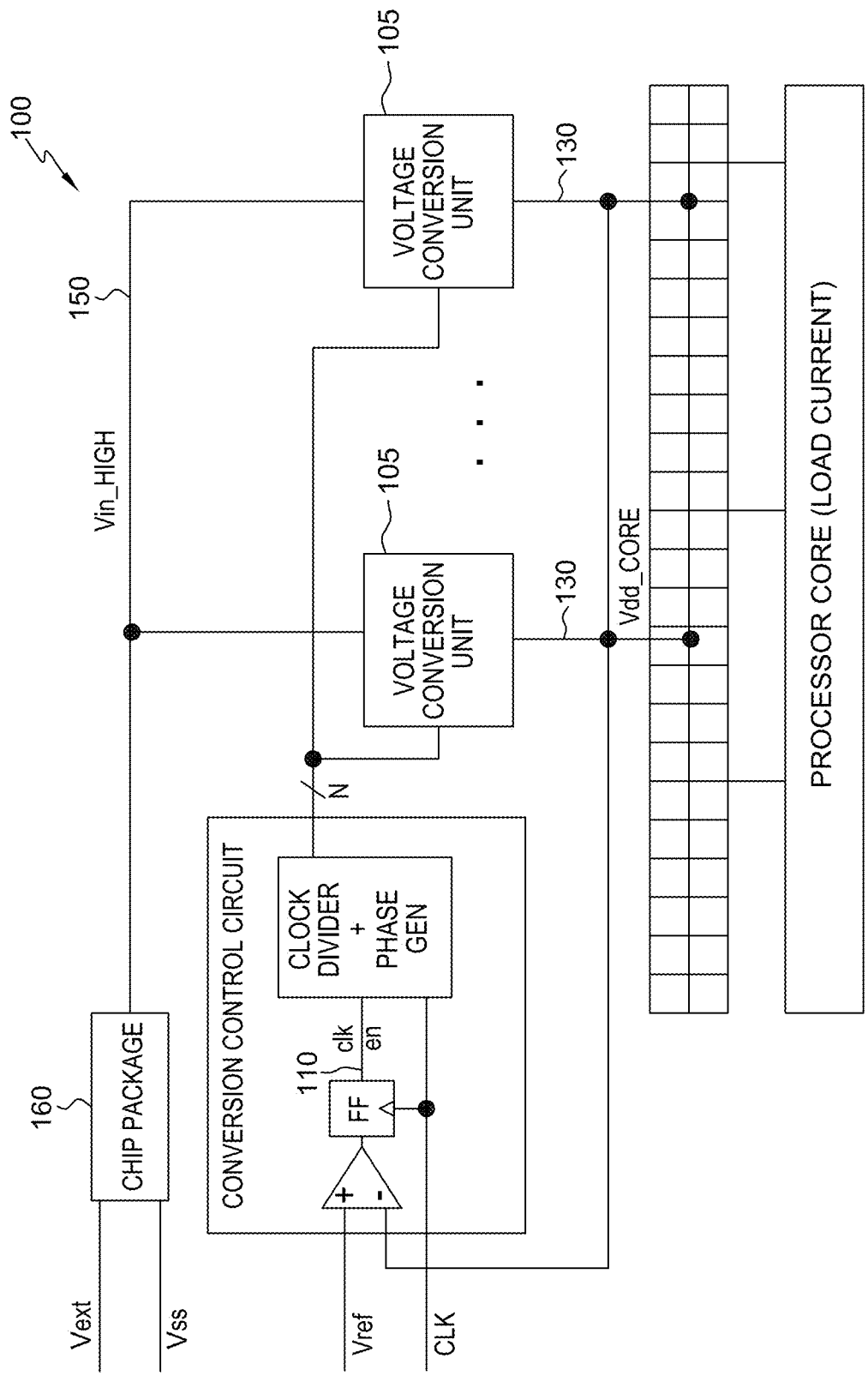
FIG. 1a is a schematic diagram illustrating an on-chip voltage converter.
Figure 1B:
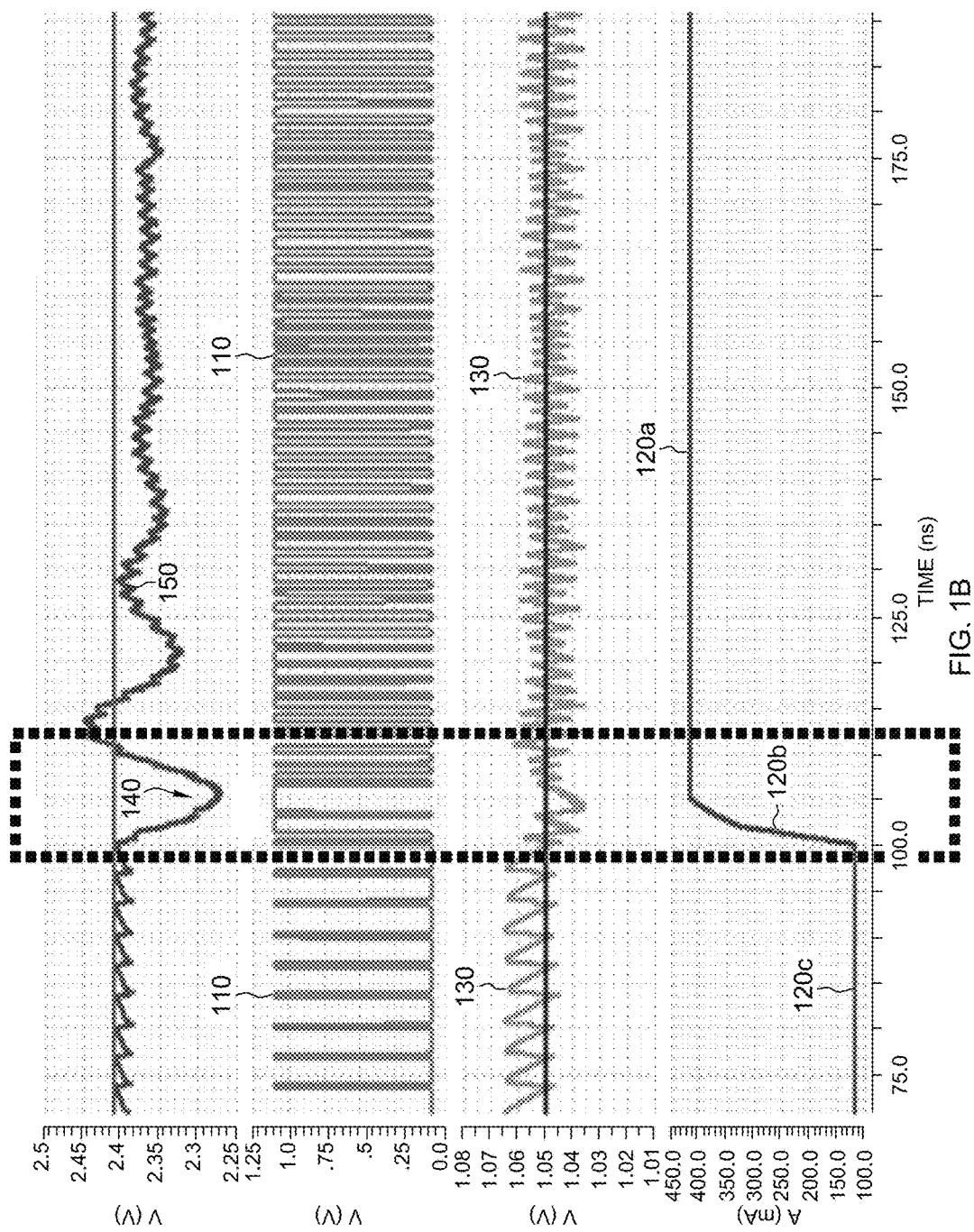
FIG. 1b is a timing diagram illustrating a response of the voltage converter of FIG. 1a to an abrupt load change.

The embodiments disclosed herein provide switched-capacitor voltage converters with improved voltage regulation. For example, referring to the schematic of FIG. 1a and the timing diagram of FIG. 1b, a voltage converter 100 may provide current by clocking one or more switched capacitor voltage conversion circuits 105 at a fixed rate when current is needed as specified by an enable conversion signal 110. To provide sufficient current levels during periods of high current demand 120a and maintain a relatively constant output voltage 130, the conversion circuit is activated more often than periods of low current demand 120c. The voltage conversion circuit is typically sized larger than that which might otherwise be necessary to deliver the maximum steady-state current, as abrupt changes in current demand 120b may cause a droop 140 in the input voltage 150, caused by the inductance of the package 160 that encloses the conversion circuit and other circuitry.

Such oversizing of the circuit can counter collapses of the input voltage 150 during such transient conditions and minimize perturbation of the converter output voltage 130, but area utilization for the circuit may increase significantly—in the range of 60% in high-performance applications. Beyond this direct area penalty, such a large increase may also limit the ability to optimize the circuit for high steady-state efficiency, as it must be sized to provide a good transient response. As such, the described voltage converter leads to tradeoffs in both area and power in practical applications.

Figure 2A:
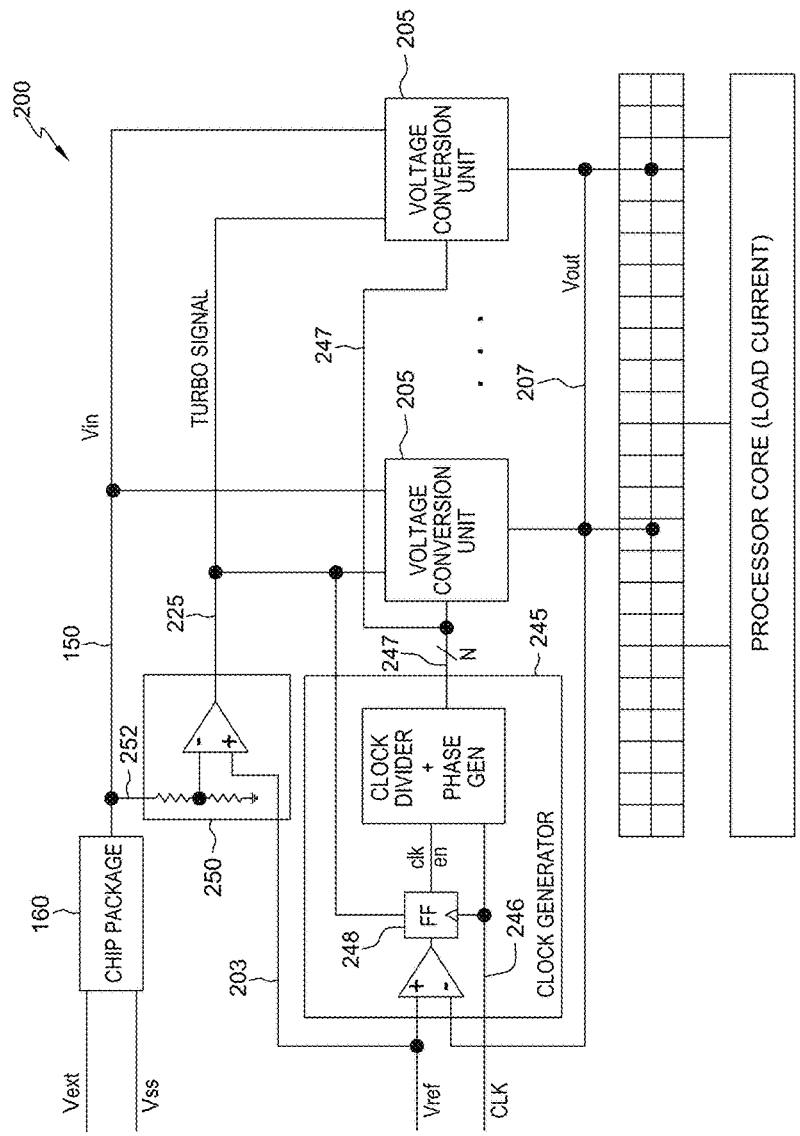
FIG. 2a is a schematic diagram illustrating one embodiment of an on-chip voltage converter in accordance with the present invention.

FIG. 2a is a schematic diagram illustrating an on-chip voltage converter 200 in accordance with the present invention. As depicted, the on-chip voltage converter 200 improves upon the on-chip voltage converter 100 by leveraging one or more voltage conversion circuits 205 instead of the voltage conversion circuit 105. Furthermore, a droop detection circuit 250 compares the input voltage 150 to a reference voltage 203, and activates an elevated (power) demand signal 225 when the input voltage 150, or a ratio thereof, falls below the reference voltage 203. The voltage conversion circuits 205 respond to the elevated demand signal 225 and provide additional current in order to maintain a consistent output voltage 207.

A clock generator 245 receives a master clock signal 246 and provides a local clock 247 to each voltage conversion unit 205. The clock generator 245 also receives the elevated demand signal 225 and increases the operating frequency of the local clock 247 when the elevated demand signal 225 is active. In the depicted embodiment, the clock generator 245 includes a flip-flop 248 that operates in a dual-edge mode when the elevated demand signal 225 is active and a single-edge mode when the elevated demand signal 225 is inactive. Therefore, during periods of elevated demand, the flip-flop 248 doubles the base clocking rate and the switching rate of the voltage conversion units 205 is twice the base switching rate. However, in other embodiments, the clocking rate during periods of elevated demand is increased but not necessarily at double the base clocking rate.

The droop detection circuit 250 receives a monitored power signal 252 and activates the elevated demand signal 225 in response to voltage droop on the monitored power signal. For example, the droop detection circuit 250 may compare the monitored power signal with a specific reference (i.e., selected) voltage 203 and activate the elevated demand signal 225 when the voltage of the monitored power signal 252, or a ratio thereof, drops below the reference voltage. In the depicted embodiment, the monitored power signal 252 is the input voltage 150 (i.e., Vin).

Some of the embodiments disclosed herein recognize that input voltage droop (e.g. due to chip package inductance) is the primary source of transient supply noise and often occurs prior to and with a larger magnitude than output voltage droop. Consequently, monitoring the input voltage (Vin) may increase the responsiveness of the voltage conversion circuit 200 over conventional voltage conversion circuits which monitor the output voltage 207 (Vout). However, the present invention is not limited to embodiments that monitor the input voltage (Vin). For example, the elevated demand signal 225 could instead be activated based on monitoring the output voltage or another system voltage.

Figure 2B:
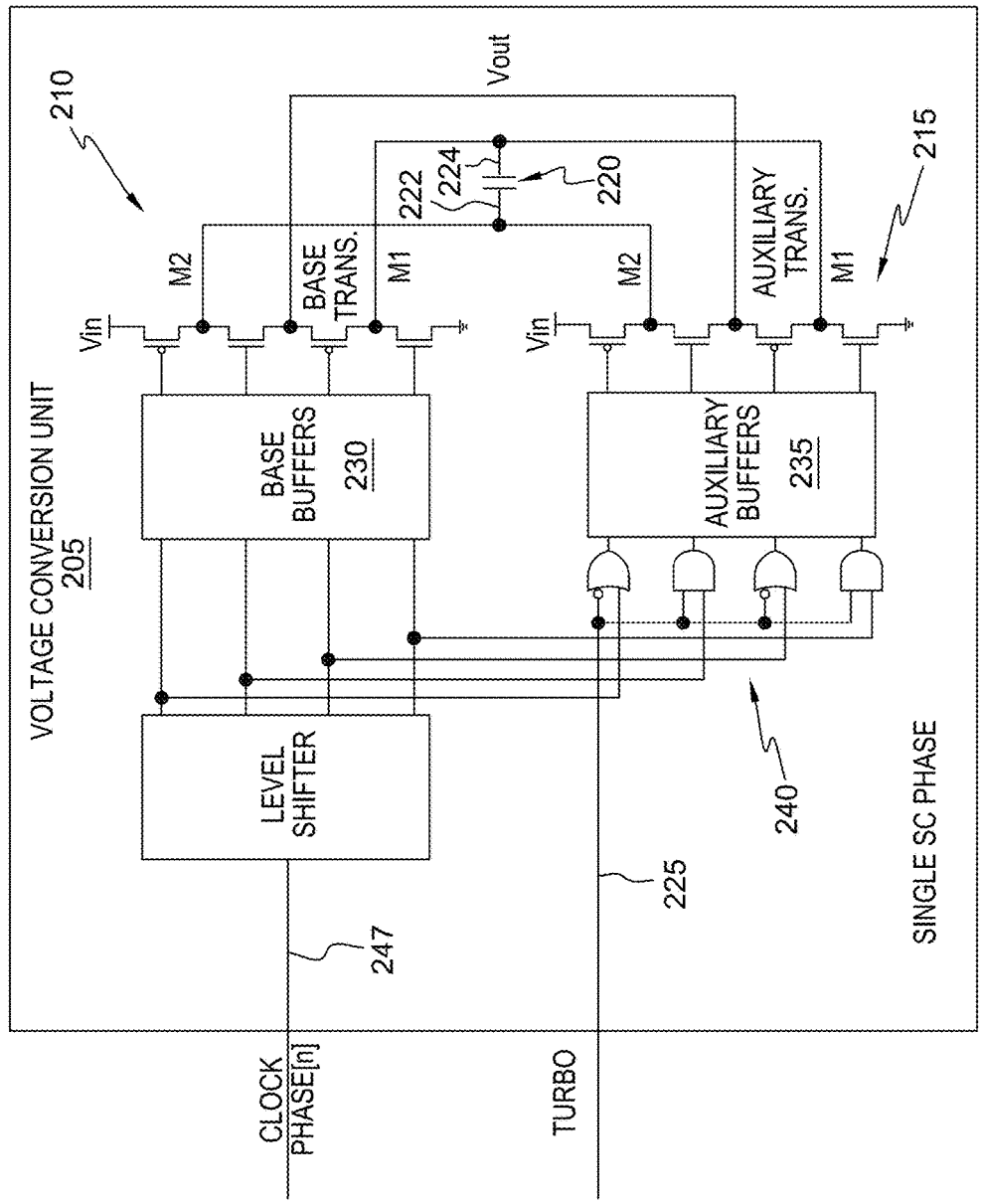
FIG. 2b is a schematic diagram of one embodiment of a voltage conversion circuit in accordance with the present invention.

FIG. 2b is a schematic diagram of one embodiment of the voltage conversion circuit 205 in accordance with the present invention. As depicted, the voltage conversion circuit 205 includes a set of base transistors 210, a set of auxiliary transistors 215, a flying capacitor 220, base buffers 230, auxiliary buffers 235, and control logic 240. The voltage conversion circuit 200 provides for optimized voltage conversion efficiency during steady state periods, as well as a high-current mode during periods of elevated demand, such as might be caused by input power droop during a load transient.

The depicted flying capacitor 220 has two terminals 222 and 224. In the depicted embodiment, the base transistors 210 and the auxiliary transistors 215 switch terminals 222 and 224 from the voltage input (Vin) and voltage output (Vout) and then to the voltage output (Vout) and ground during the two phases of operation. One of skill in the art will recognize that switching in the described manner provides a voltage conversion ratio of approximately 2:1.

The base buffers 230 and the auxiliary buffers 235 receive an input signal for each buffer and drive the base transistors 210 and the auxiliary transistors 215, respectively, according to the input signal for each buffer. In the depicted embodiment, there are four base buffers 230 and four auxiliary buffers 235 corresponding, respectively, to the four base transistors 210 and the four auxiliary transistors 215 shown in FIG. 2B.

The control logic 240 receives the elevated demand signal 225 and provides control signals to the auxiliary transistors via the auxiliary buffers 235. The control logic 240 disables the auxiliary transistors 215, when the elevated demand signal 225 is inactive and enables the auxiliary transistors 215, when the elevated demand signal 225 is active. Consequently, when the elevated demand signal 225 is active, the base transistors 210 and the auxiliary transistors 215 operate in parallel and the RC time constant to switch the flying capacitor 220 and associated circuitry is reduced. A reduced RC time constant enables the voltage conversion circuit 200 to operate effectively at a higher switching rate.

In the depicted embodiment, the base transistors 210, the auxiliary transistors 215, switched capacitor 220, the base buffers 230, the auxiliary buffers 235, the control logic 240 and other related circuitry form the voltage conversion unit 205. The voltage conversion circuit 200 may have multiple voltage conversion units 205 that operate in parallel. For example, the voltage conversion units 205 may be operated in parallel with different phase offsets in order to reduce output voltage ripple.

Figure 3:
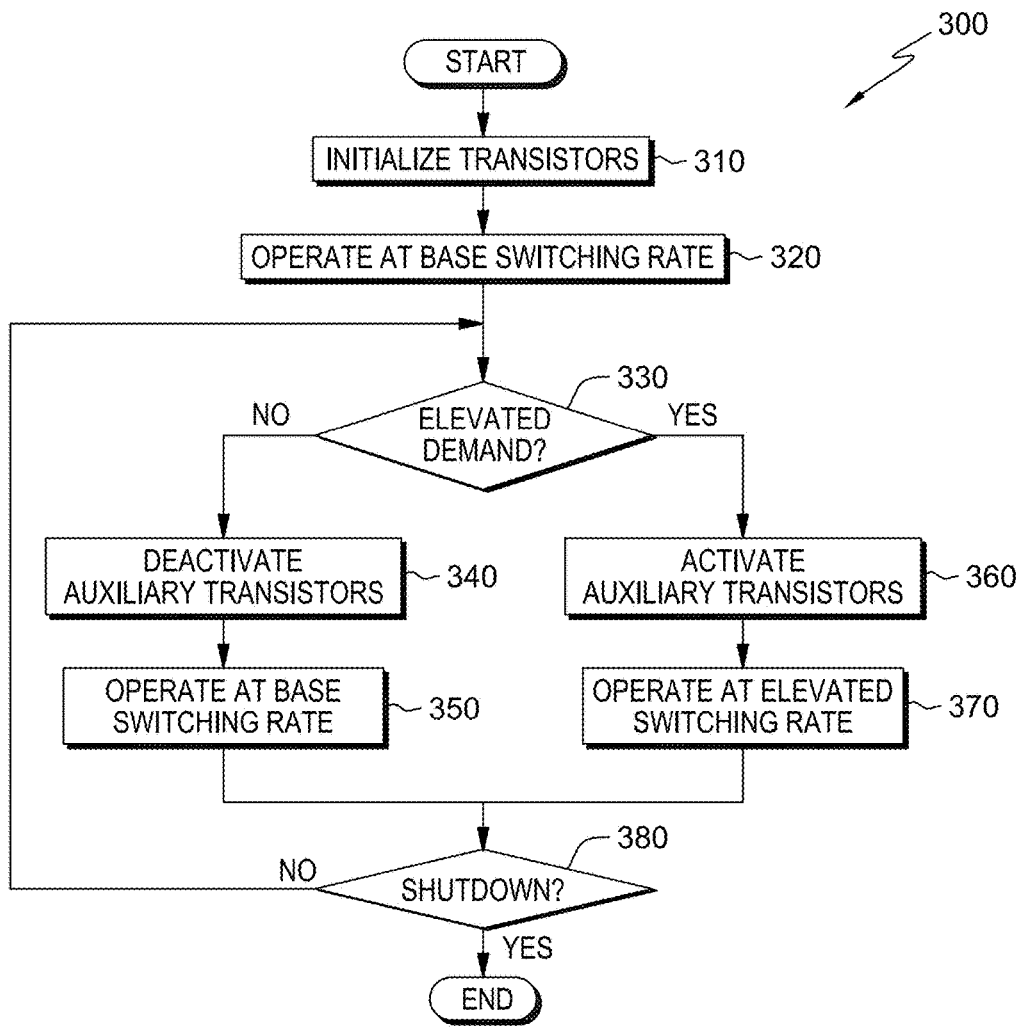
FIG. 3 is a flowchart diagram of one embodiment of a voltage conversion method in accordance with the present invention.

FIG. 3 is a flowchart diagram of a voltage conversion method 300 in accordance with the present invention. As depicted, the voltage conversion method 300 includes initializing (310) the transistors, operating (320) at a base switching rate, determining (330) whether an elevated power demand condition exists, and determining (380) whether a shutdown request has occurred. The method 300 also includes deactivating (340) the auxiliary transistors and operating (350) at a base switching rate if an elevated power demand condition does not exist, and activating (360) the auxiliary transistors and operating (370) at an elevated switching rate if the elevated power demand condition does exist. The voltage conversion method 300 may be conducted in conjunction with the voltage conversion circuit 200 or the like.

Initializing (310) the transistors may include activating the base transistors and deactivating the auxiliary transistors. In some embodiments, the base transistors are hardwired to an active state and need not be activated. Operating (320) at a base switching rate may include resetting a clocking circuit (e.g., the clock generator 245 depicted in FIG. 2a) to a base clocking frequency.

Determining (330) whether an elevated power demand condition exists may include monitoring a power signal for voltage droop. If an elevated power demand condition does not exist, the method continues to operations 340 and 350 in order to deactivate the auxiliary transistors and operate at the base switching rate. If an elevated power demand condition does exist, the method continues to operations 360 and 370 in order to activate the auxiliary transistors and operate at the elevated switching rate.

Figure 4:
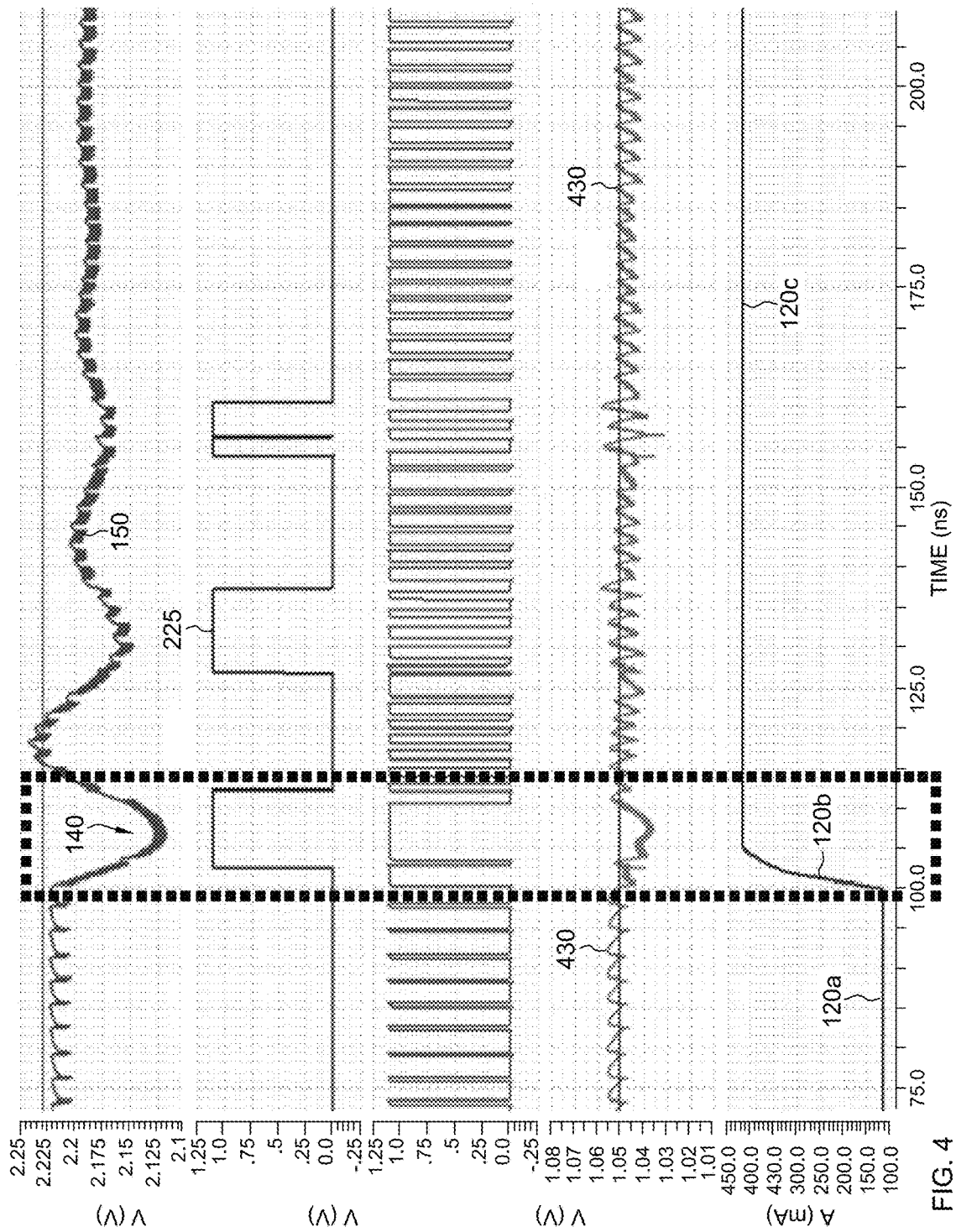
FIG. 4 is a timing diagram illustrating a response of one embodiment of the voltage converter of FIG. 2a to an abrupt load change.

FIG. 4 is a timing diagram illustrating the response of the on-chip voltage converter 200 to an abrupt load change. Referring simultaneously to FIGS. 2a, 2b and 4, during periods of abrupt changes in current demand 120b, the elevated demand signal 225 is activated due to an abrupt droop 140 in the input voltage 150, caused by the inductance of the package 160 within which the integrated circuit is enclosed. The elevated demand signal 225 activates the auxiliary transistors 215 and activates an elevated switching rate for the voltage conversion circuits 205. The increased current generation capacity provided by operating at an elevated switching rate minimizes droop in the output voltage 430 (i.e., the output voltage 207 in FIG. 2A) during periods of input voltage droop 140 without the need to oversize the conversion circuit. During other periods, the circuit operates at the base switching rate with the auxiliary transistors 215 deactivated, which delivers less output current at higher efficiency.

The embodiments disclosed herein reduce output voltage swings for a wide range of load conditions including abrupt load changes. The use of auxiliary transistors increases the current output capabilities when needed, and enables improved efficiency when not needed while lowering overall circuit area. For example, the area of one embodiment of the on-chip voltage converter 200 was approximately 38 percent less than the area of a corresponding embodiment of the on-chip voltage converter 100.

It should be noted that the apparatuses disclosed herein may be integrated with additional circuitry within integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus for providing on-chip voltage-regulated power, the apparatus comprising:
   a switched capacitor voltage conversion circuit configured to receive an elevated power demand signal and operate at a base rate at a selected voltage when the elevated power demand signal is not active and an elevated rate at the selected voltage when the elevated power demand signal is active;
   wherein the switched capacitor voltage conversion circuit comprises an auxiliary set of transistors that are disabled when the elevated power demand signal is not active and enabled when the elevated power demand signal is active to provide additional output current at the selected voltage; and
   a clocking circuit configured to provide a clocking signal at a base rate when the elevated power demand signal is not active and at an elevated rate when the elevated power demand signal is active.

2. The apparatus of claim 1, wherein the clocking circuit comprises a flip-flop that is selectively configurable to operate in a single edge mode and a dual edge mode.

3. The apparatus of claim 1, wherein the elevated rate is an integer multiple of the base rate.

4. The apparatus of claim 3, wherein the elevated rate is twice the base rate.

5. The apparatus of claim 1, wherein the auxiliary set of transistors reduce an RC time constant of the switched capacitor voltage converter when the elevated power demand signal is active.

6. A method for providing on-chip voltage-regulated power, the method comprising:
   converting a power input to a power output by operating a switched capacitor voltage conversion circuit at a base rate at a selected voltage during normal power demand conditions and an elevated rate at the selected voltage during elevated power demand conditions; and
   wherein the switched capacitor voltage conversion circuit comprises an auxiliary set of transistors that are disabled during normal power demand conditions and enabled during elevated power demand conditions to provide additional output current at the selected voltage; and
   providing a clocking signal for the switched capacitor voltage conversion circuit at a base rate when the elevated power demand signal is not active and at an elevated rate when the elevated power demand signal is active.

7. The method of claim 6, wherein the elevated rate is an integer multiple of the base rate.

8. The method of claim 7, wherein the elevated rate is twice the base rate.

9. The method of claim 6, wherein the auxiliary set of transistors reduce an RC time constant of the switched capacitor voltage conversion circuit when the elevated power demand signal is active.

10. An apparatus for providing on-chip voltage-regulated power, the apparatus comprising:
    a switched capacitor voltage conversion circuit comprising a base set of transistors and an auxiliary set of transistors, the switched capacitor voltage conversion circuit configured to receive an elevated power demand signal and operate at a base rate at a selected voltage when the elevated power demand signal is not active and an elevated rate at the selected voltage when the elevated power demand signal is active;
    wherein the auxiliary set of transistors are disabled when the elevated power demand signal is not active and enabled when the elevated power demand signal is active to provide additional output current at the selected voltage; and
    wherein the auxiliary set of transistors reduce an RC time constant of the switched capacitor voltage conversion circuit when enabled;

a clocking circuit configured to provide a clocking signal at a base rate when the elevated power demand signal is not active and at an elevated rate when the elevated power demand signal is active; and wherein the clocking circuit comprises a flip-flop that is selectively configurable to operate in a single edge mode and a dual edge mode.

11. The apparatus of claim 10, wherein the monitored power signal corresponds to an input power supply for the switched capacitor voltage conversion circuit.

* * * * *